United States Patent
John et al.

(10) Patent No.: US 8,831,882 B1
(45) Date of Patent: Sep. 9, 2014

(54) COMPUTING SYSTEMS, DEVICES AND METHODS FOR IDENTIFYING IMPORTANT ACCESS ROADS TO A GEOGRAPHIC LOCATION

(71) Applicant: Google Inc., Mountain View, CA (US)

(72) Inventors: John Payyappillil John, Mountain View, CA (US); Yatin Chawathe, Mountain View, CA (US); Nicholas Lee, Mountain View, CA (US); Matthew Zhong Qing Wu, Mountain View, CA (US); Chris Gonterman, Mountain View, CA (US); Ross Morgan-Linial, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/895,043

(22) Filed: May 15, 2013

(51) Int. Cl.
G01C 21/34 (2006.01)
G01C 21/36 (2006.01)

(52) U.S. Cl.
CPC .................................. G01C 21/3626 (2013.01)
USPC ........................................................ 701/533

(58) Field of Classification Search
None
See application file for complete search history.

(56) References Cited

U.S. PATENT DOCUMENTS

| | | | | |
|---|---|---|---|---|
| 5,486,822 A * | 1/1996 | Tenmoku et al. | ........ | 340/995.22 |
| 6,049,753 A * | 4/2000 | Nimura | .......................... | 701/428 |
| 8,321,126 B2 | 11/2012 | Mays | | |
| 8,335,647 B2 * | 12/2012 | Kurtti et al. | .................... | 701/533 |
| 8,457,682 B2 * | 6/2013 | Raab | .......................... | 455/550.1 |
| 2001/0041961 A1 * | 11/2001 | Feigen | .......................... | 701/209 |
| 2003/0055558 A1 * | 3/2003 | Watanabe et al. | .............. | 701/208 |
| 2005/0071078 A1 * | 3/2005 | Yamada et al. | ................ | 701/201 |
| 2005/0192742 A1 * | 9/2005 | Okochi | .......................... | 701/209 |
| 2005/0283311 A1 * | 12/2005 | Ohler | .............................. | 701/209 |
| 2007/0005235 A1 * | 1/2007 | Suzuki et al. | .................. | 701/200 |
| 2007/0010942 A1 * | 1/2007 | Bill | ................................ | 701/209 |
| 2009/0112465 A1 * | 4/2009 | Weiss et al. | .................... | 701/211 |
| 2009/0281726 A1 * | 11/2009 | Byrne et al. | .................... | 701/209 |
| 2010/0106603 A1 * | 4/2010 | Dey et al. | .................... | 705/14.63 |
| 2010/0312466 A1 * | 12/2010 | Katzer et al. | ................... | 701/201 |
| 2010/0332130 A1 * | 12/2010 | Shimizu et al. | ............... | 701/209 |
| 2011/0145290 A1 * | 6/2011 | Fujii et al. | ...................... | 707/780 |
| 2011/0172908 A1 * | 7/2011 | Singh | .............................. | 701/201 |
| 2011/0208429 A1 * | 8/2011 | Zheng et al. | ................... | 701/209 |
| 2013/0179070 A1 * | 7/2013 | Kristinsson et al. | ........... | 701/467 |

FOREIGN PATENT DOCUMENTS

EP 1 993 075 A1 11/2008

OTHER PUBLICATIONS

Abruzzo et al., "Models" 306090 Books vol. 11, p. 234-235 (2007).
Basicin, "Wedding Etiquette and Tips: Direction Card, Map Card Wording," (2013). Retrieved from the Internet on Jul. 29, 2013: URL:http://www.basicinvite.com/wedding-etiquette/direction-card-and-map-card-wording.

* cited by examiner

*Primary Examiner* — John R Olszewski
*Assistant Examiner* — Navid Ziaeianmehdizadeh
(74) *Attorney, Agent, or Firm* — Marshall, Gerstein & Borun LLP

(57) ABSTRACT

To identify important access roads for a geographic location, multiple previous requests for directions between a multiplicity of sources and one or more destinations identical, or proximate, to the geographic location are identified. Further, routes between the multiplicity of sources and the one or more destinations are determined. Still further, common road segments shared by at least some of the determined routes are identified, and a set of important access roads for the geographic location are selected from among the identified road segments based on how frequently the identified road segments are used.

12 Claims, 7 Drawing Sheets

COMPUTING SYSTEMS, DEVICES AND METHODS FOR IDENTIFYING IMPORTANT ACCESS ROADS TO A GEOGRAPHIC LOCATION

FIELD OF THE DISCLOSURE

The present disclosure relates to interactive digital maps and, more particularly, to identifying and presenting "important" access roads for various geographic locations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Systems that dynamically determine turn-by-turn directions between a starting point and a destination in response to a request for directions are common. Turn-by-turn directions may be provided in response to a user entering a starting point and a destination within a navigation device. Directions from various starting points to locations, such as popular landmarks, popular restaurants, popular tourist destinations, etc. may be requested regularly. Routes resulting from the requests for directions between the various starting points and the locations may include common segments.

SUMMARY

The present disclosure relates to identifying important access roads to various geographic locations. In some implementations, a network server executes a batch process to identify important access roads to geographic locations based on common segments shared by routes corresponding to previous requests for direction from various starting points. For a certain geographic location, previous relevant requests for directions may specify the geographic location as the destination or, in some cases, proximate not identical geographic locations. In particular, locations that are not directly associated with previous requests for directions may be associated with a larger geographic area, which may be dependent on such geographic parameters as density of population, the number of available previous requests for directions, etc.

In particular, an example embodiment of these techniques is a method in a computing system for identifying important access roads for a geographic location. The method includes identifying a plurality of previous requests for directions between a multiplicity of sources and one or more destinations identical, or proximate, to the geographic location. The method also includes determining routes between the multiplicity of sources and the one or more destinations, identifying common road segments shared by at least some of the determined routes, and selecting, from among the identified road segments, a set of important access roads for the geographic location based on how frequently the identified road segments are used.

Another embodiment of the techniques of the present disclosure is a method in a client device having a user interface for providing important access road information for geographic locations. The method includes displaying an interactive digital map via the user interface and receiving, via the user interface, a selection of a geographic location on the digital map. The method further includes automatically displaying important access roads for the selected geographic location on the digital map in a visually distinctive manner, where the important access roads indicate frequently used segments of routes between a multiplicity of sources and destinations that are identical, or proximate, to the geographic location.

Yet another embodiment of the techniques of the present disclosure is a method in a computing system for identifying important access roads for a geographic location. The method includes selecting a geographic area that encloses the geographic location, identifying previous requests for directions between a multiplicity of sources and a plurality of destinations within the geographic area, determining routes between the multiplicity of sources and the plurality of destinations, identifying common road segments shared by at least some of the determined routes between the respective sources and a boundary of the geographic area, and selecting, from among the identified road segments, a set of important access roads for the geographic area.

The features and advantages described in this summary and the following detailed description are not all-inclusive. Many additional features and advantages will be apparent to one of ordinary skill in the art in view of the drawings, specification, and claims hereof.

DETAILED DESCRIPTION

Overview

Figure 1:
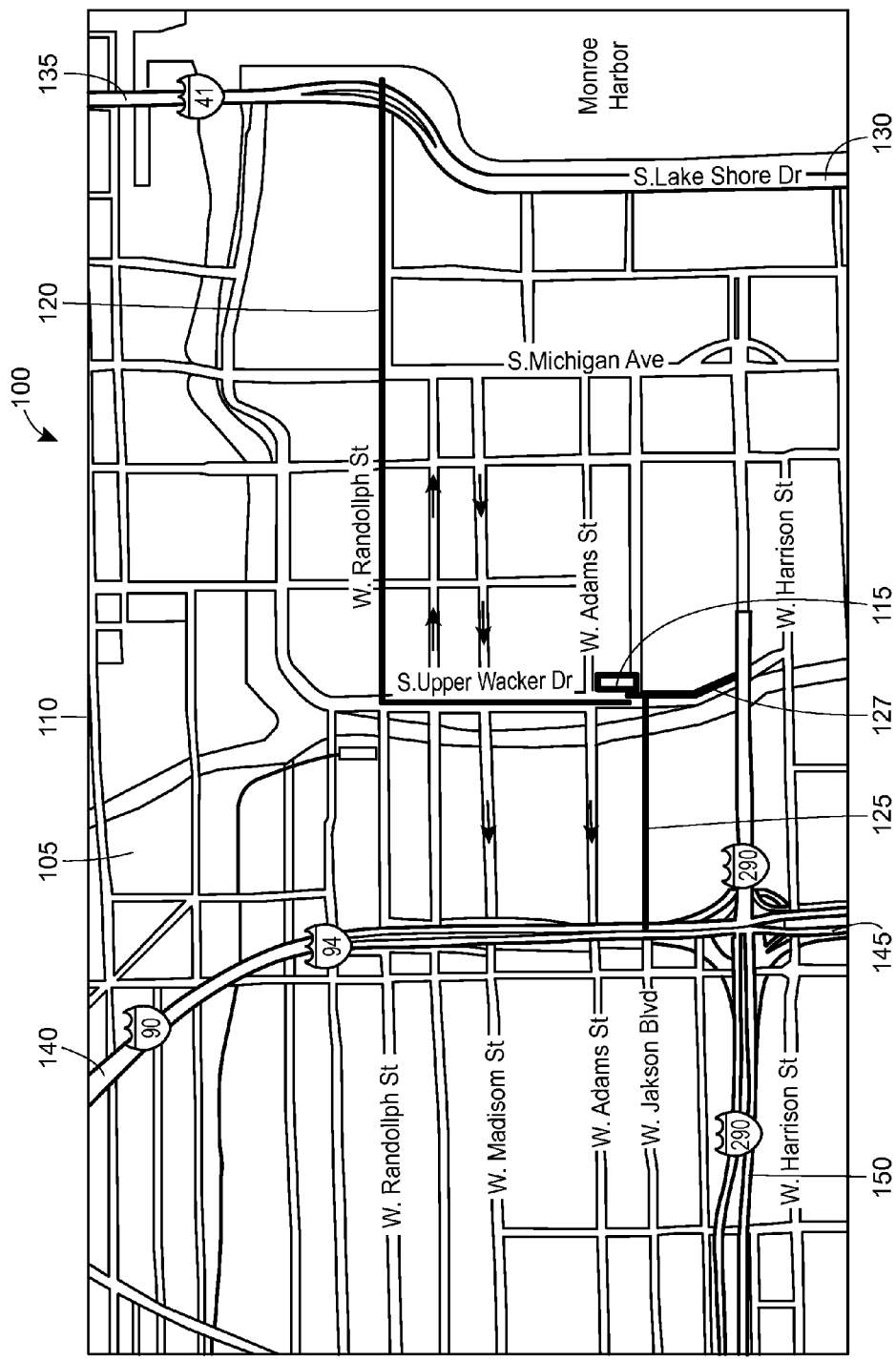
FIG. 1 depicts an example geographic digital map in which important access roads to a user-selected location are highlighted.

The geographic mapping applications of the present disclosure identify important access roads to geographic locations, or to boundaries of geographic areas enclosing these geographic locations, based on data representative of previously requested directions or navigation requests to the geographic locations from various starting points. This data is referred to below as "navigation data" or "directions data." The important access roads may be highlighted, or otherwise made visually eminent, within a geographic map display in response to a user selecting a point within the geographic map display. In particular, the geographic mapping application may highlight some of the roads, apply or promote labels, etc. to identify the important access roads within the geographic map display in response to a user selecting a location within the geographic map display.

As described in more detail below, a geographic mapping application may identify important access roads to a certain location by first identifying previous requests for directions from various starting points, in which the location was selected as the destination. The geographic mapping application then may retrieve the appropriate directions to the destination for the starting points according to a common principle (e.g., the shortest route, the fastest route). To this end, the geographic mapping application may query a directions and/or navigation service, for example. The geographic mapping application then may identify candidate access roads for the various locations based on the retrieved directions. More specifically, the geographic mapping application may identify road segments that are common to multiple routes. Finally, the geographic mapping application may identify certain road segments as being "important" access roads when these road segments are used more frequently than the other common road segments (e.g., at least twice as often than another candidate segment), or when the frequency at which these road segments are used exceeds a predefined threshold.

In some implementations, the geographic mapping application may perform these operations for a large number of locations using an offline batch process. In particular, the geographic mapping application may operate in a network server to identify important access roads for various locations and store this information in an important access roads database. In this manner, the need to compute common access roads to a user-selected location in real time is (at least partially) eliminated.

As also described in detail below, when few (if any) directions to a location have been previously requested, the geographic mapping application may initially associate the location with a geographic area that encloses points that are treated similarly to the location for the purpose of identifying previous requests for directions. The geographic mapping application may retrieve directions data, which is representative of the previous request for directions to any points within the geographic area and compute important access roads to points on a boundary of the geographic area. The identified important access roads can be associated with the geographic area and stored in an important access roads database for the geographic area. When the user selects the location on a digital map displayed on a client device, the pre-computed important access roads for the enclosing geographic area can be efficiently provided to the client device, and directions from the points on the boundary of the enclosing geographic where the pre-computed important access roads end to the location are computed dynamically (either on the client device or on the server, depending on the implementation).

Example Depiction and Identification of Important Access Roads

Turning to FIG. 1, a geographic mapping application executing on a client device such as a desktop computer, a laptop computer, a table computer, a smartphone, etc. can generate display 100 in an example scenario. The display 100 illustrates a geographic map 105 depicted within a map viewport 110 including a location 115 which is directly associated with important access roads 120, 125, 127. The important access roads 120, 125, 127 may be identified and associated with the location 115 based on previous requests for directions to the location 115 from various starting points. While location 115 is the only location specifically identified within geographic map 105, it should be understood that multiple locations (similar to location 115) may be included within any given geographic map 105. Important access roads (similar to important access roads 120, 125, 127) may be identified and associated with each of the several locations. When a user selects the location 115, using any suitable user input device (e.g., a mouse, a touchscreen), the important access roads 120, 125, 127 may be highlighted or otherwise made visually eminent within the geographic map 105. Further, a location marker may be displayed at the location 115 (omitted from FIG. 1 to avoid clutter).

As can be seen from FIG. 1, the important access road 120 may serve as a preferred route for travelers coming from the North-East along roadway 135 and for travelers coming from the South-East along roadway 130. The important access road 125 may serve as a preferred route for travelers coming from the North-West along roadway 140. The important access road 127 may serve as a preferred route for travelers coming from the West along roadway 150 and for travelers coming from the South-West along roadway 145. The important access roads 120 and 125 in this example connect the location 115 to divided highways or other major high-speed roads. In other implementations or scenarios, however, important access roads can extend from the selected location for a certain distance (e.g., a two-mile radius) or according to any other suitable principle.

While not shown in FIG. 1, it should be understood that, due to one-way streets and/or other traffic patterns, important access roads to a location may be different than important access roads from the location. As discussed below, important access roads to a location and important access roads from the location may be identified and associated with the location. The important access roads from a location may be visually differentiated from important access roads to the location when displayed within an associated geographic map display. For example, arrows may be incorporated to depict the differentiation and/or different colors may be used to impart differentiation.

Figure 2A:
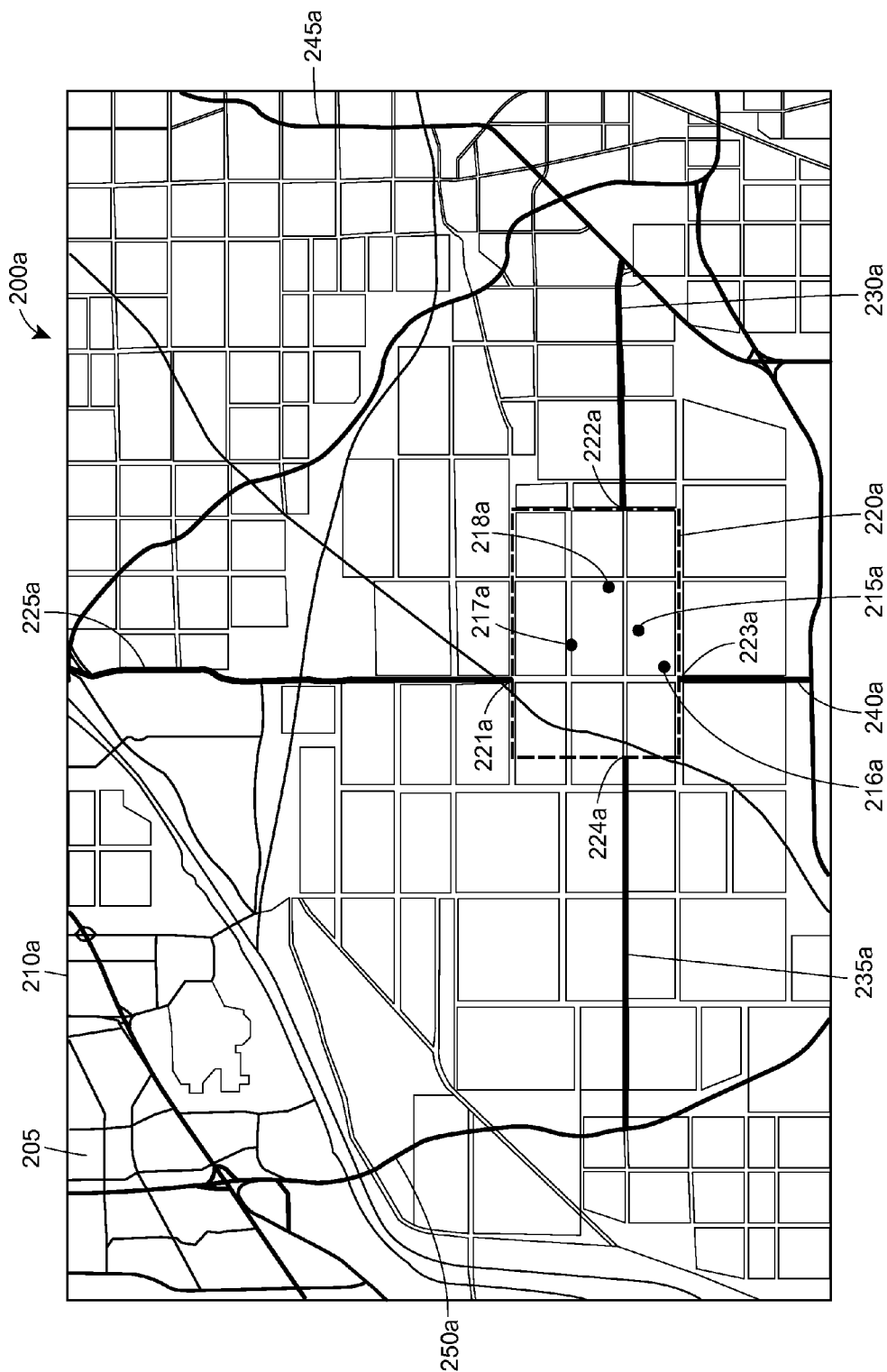
FIG. 2A schematically illustrates an example geographic area on a digital map in which a user-selected location is inside the geographic area, and important access roads terminate at the boundary of the geographic area.

Turning to FIG. 2A, an example display 200a includes a geographic map 205a depicted within a map viewport 210a. The geographic map 205a may include a location 215a that is associated with geographic area 220a, destinations 216a, 217a, 218a and important access roads 225a, 230a, 235a, 240a.

The location 215a differs from the location 115 of FIG. 1 in that the location 215a does not directly have an association with any important access roads, according to previous requests for directions. In other words, there have not been sufficient requests for directions specifically to the location 215a to identify access roads. Instead, the location 215a is associated with the bounded geographic area 220a which is, in turn, associated with the important access roads 225a, 230a, 235a, 240a based on previous requests for directions to any of the destinations 216a, 217a, 218a from various starting points. It is noted that the boundaries of the geographic area 220a need not be displayed to the user, and that FIG. 2A illustrates these boundaries for the purposes of this discussion only.

For clarity, only one location 215a is identified within the geographic map 205a. While location 215a is the only location specifically identified within geographic map 205a, it should be understood that multiple locations (similar to location 215a) may be included within any given geographic map 205a and any point within the geographic map 205a may be associated with a corresponding location 215a. When a user selects the location 215*a* (or any point within the geographic area 220*a*), using any suitable user input device, the important access roads 225*a*, 230*a*, 235*a*, 240*a* may be highlighted or otherwise made visually eminent within the geographic map 205*a*. As can be seen from FIG. 2A, the important access road 225*a* may serve as a preferred route for travelers coming from the North. The important access road 230*a* may serve as a preferred route for travelers coming from the North-East along roadway 245*a* or travelers coming from the South-East. The important access road 235*a* may serve as a preferred route for travelers coming from the North-West along roadway 250*a* and for travelers coming from the South-West. The important access road 240*a* may serve as a preferred route for travelers coming from the South. For clarity, FIG. 2A does not illustrate access roads inside the geographic area 220*a*, which are determined as discussed below with reference to FIG. 2B.

Figure 2B:
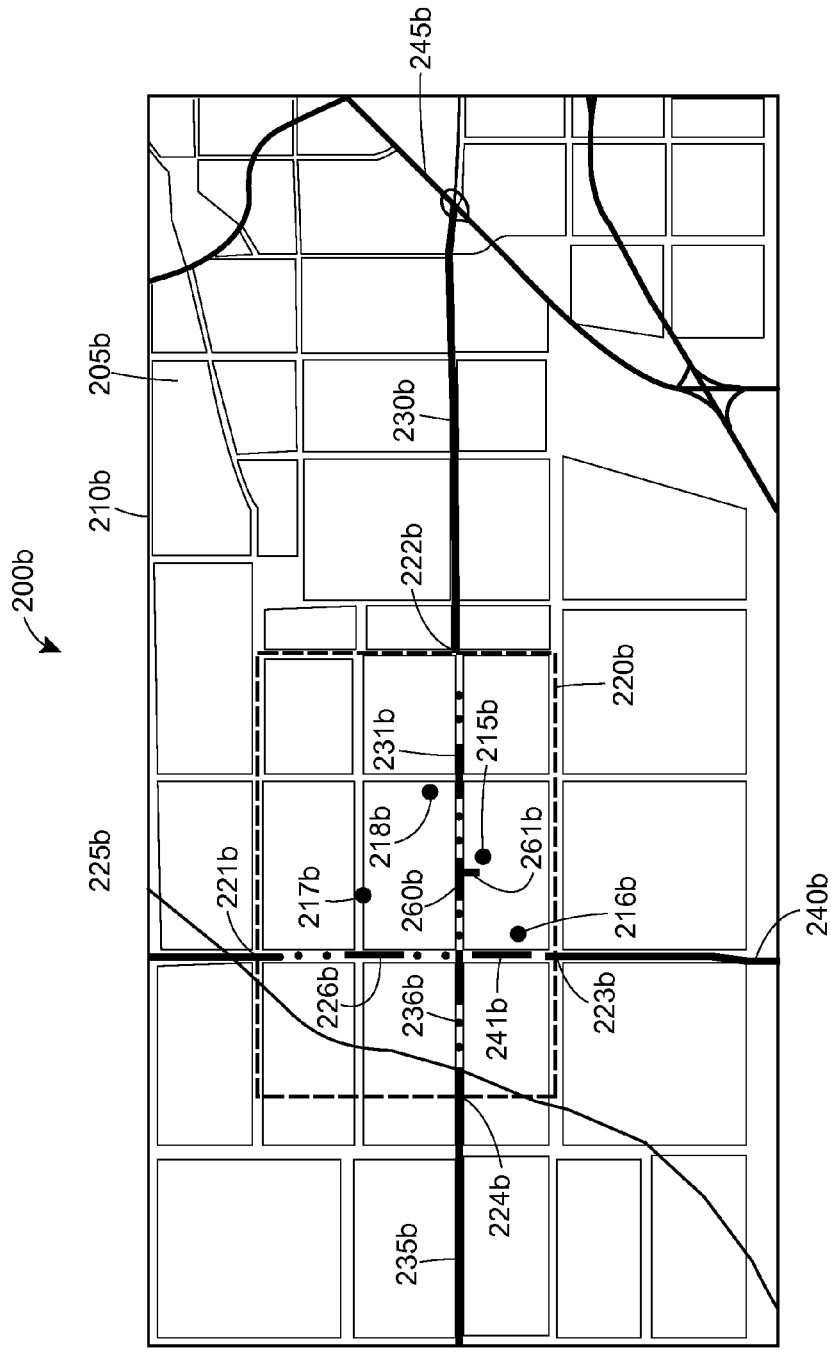
FIG. 2B depicts an example digital map with a geographic area enclosing a user-selected location, in which important access roads to the geographic area, along with routes from the boundary of the geographic area to the user-selected location, are highlighted.

With further reference to FIG. 2A and additional reference to FIG. 2B, an example display 200*b* is illustrated as a portion of the display 200*a* of FIG. 2A. The display 200*a* includes a geographic map 205*b* (which is a portion of the geographic map 205*a*) depicted within a map viewport 210*b*. Other reference numbers of FIG. 2B correspond to similarly numbered elements of FIG. 2A. As depicted in FIG. 2B, the important access road 225*b* extends to a first point 221*b* on a boundary of the geographic area 220*b*. The important access road 230*b* extends from the roadway 245*b* to a second point 222*b* on the boundary of the geographic area 220*b*. The important access road 240*b* extends to a third point 223*b* on the boundary of the geographic area 220*b* and the important access road 235*b* extends to a fourth point 224*b* on the boundary of the geographic area 220*b*. When a user selects the location 215*b*, the important access roads 225*b*, 230*b*, 235*b*, 240*b* may be highlighted or otherwise made visually eminent to the points 221*b*, 222*b*, 223*b*, 224*b* and the routes 226*b*, 231*b*, 236*b*, 241*b*, 260*b*, 261*b*, extending from the points 221*b*, 222*b*, 223*b*, 224*b* may be dynamically determined. The routes 226*b*, 231*b*, 236*b*, 241*b*, 260*b*, 261*b* may be dynamically determined by querying a navigation service (e.g., navigation service 370 of FIG. 3) for directions from each of the points 221*b*, 222*b*, 223*b*, 224*b* to the location 215*b*. The routes 226*b*, 231*b*, 236*b*, 241*b*, 260*b*, 261*b* may be highlighted or otherwise made visually eminent.

With further reference to FIGS. 2A and 2B, when a user selects any one of the destinations 216*b*, 217*b*, 218*b*, the important access roads 225*b*, 230*b*, 235*b*, 240*b* may be highlighted or otherwise made visually eminent to the points 221*b*, 222*b*, 223*b*, 224*b* and routes extending from the points 221*b*, 222*b*, 223*b*, 224*b* to the selected destination 216*b*, 217*b*, 218*b* may be dynamically determined. For clarity, access routes inside the geographic area 220*a* are depicted in FIG. 2B using different styles. However, in at least some of the implementations, all portions of important access roads can be depicted in the same manner.

In general, the geographic area 220*a*, 220*b* may be larger or smaller than depicted in FIGS. 2A and 2B depending on the number of previous requests for directions associated with the location, types of destinations within the geographic area, density of population, etc. For example, in rural areas, a geographic area may encompass several square miles.

Example Computing Environment and Example Methods

Figure 3:
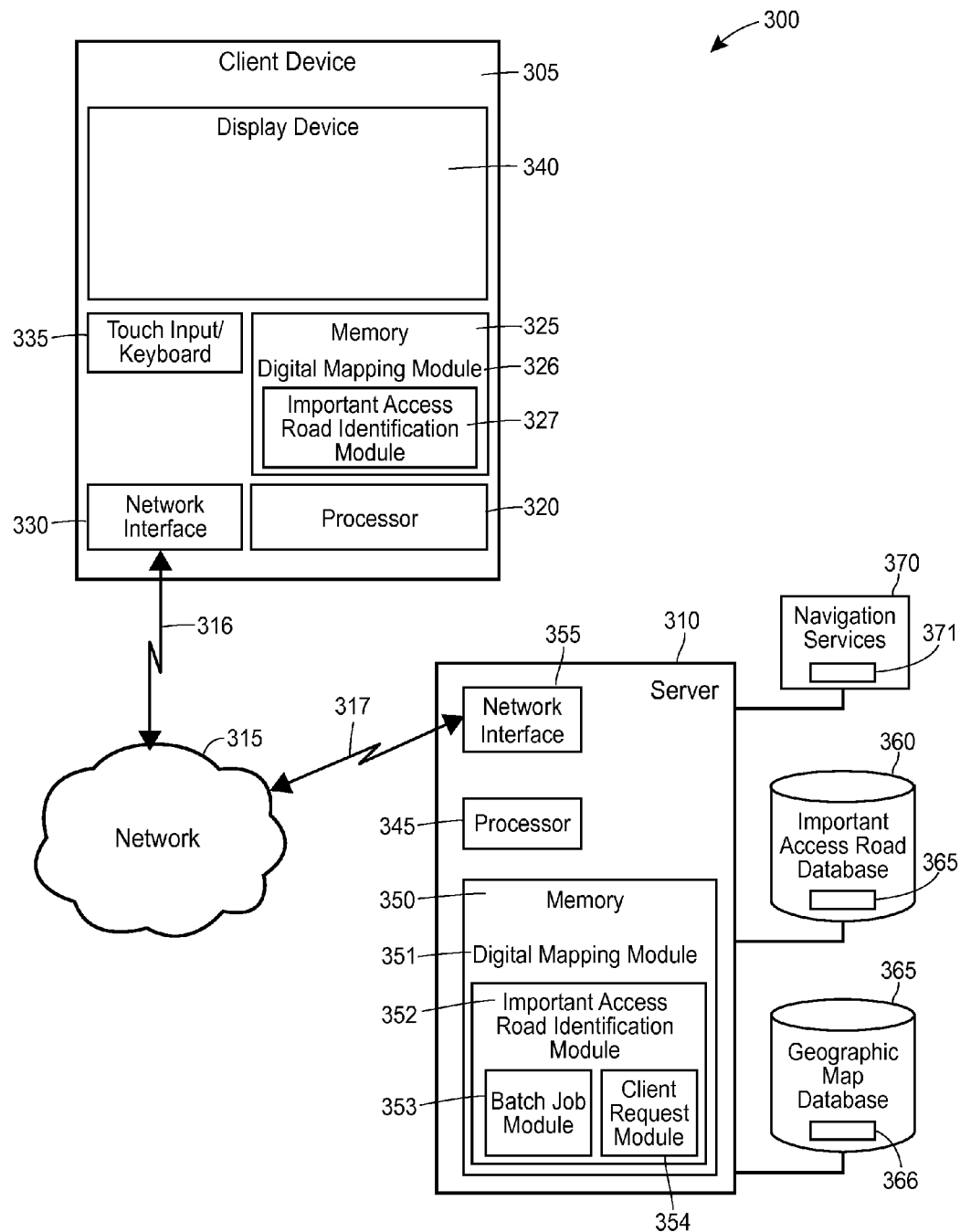
FIG. 3 depicts a high-level block diagram of a system for identifying important access roads to a location or to points on a boundary of a geographic area enclosing the location.

The details associated with a computer system 300 for identifying important access roads to locations and geographic areas proximate locations are now described beginning with reference to FIG. 3. FIG. 3 depicts a high-level block diagram of a computer system 300 that implements communications between a client device 305 and a remote computing device 310 to provide information to a user of the client device 305. The client device 305 is communicatively coupled to the remote computing device 310 via a network 315.

For clarity, only one client device 305 is depicted in FIG. 3. While FIG. 3 depicts only one client device 305, it should be understood that any number of client devices 305 may be supported and that each client device 305 may be any appropriate computing device, such as a desk-top computer or a lap-top computer. Alternatively, the client device 305 may be a mobile telephone, a personal data assistant, a vehicle-based computer system, etc. The client device 305 may include a memory 325 and a processor 320 for storing and executing, respectively, modules 326, 327. The modules 326, 327, stored in the memory 325 as a set of computer-readable instructions, may be related to a geographic mapping application with important access roads identification (e.g., the geographic mapping application associated with the display 105 of FIG. 1) that, when executed on a processor 320, causes geographic map display 100 to be displayed with important access roads (e.g., important access roads 120, 125, 127 of FIG. 1) visually eminent. As described in detail herein, the digital mapping module 326 and important access road identification module 327 facilitate interaction between the client device 305 and the remote computing device 310.

The processor 320, further executing the modules 326, 327, may cause the client device 305 to retrieve geographic map data 366 from a geographic map database 365, important access road data 361 from an important access road database 360 and navigation data 371 from a navigation service 370. The digital mapping module 326 may generate a geographic map display 100 using the retrieved geographic map data 366 and the retrieved important access roads data 361. The digital mapping module 326 may generate a geographic map display 200*a*, 200*b* using the retrieved geographic map data 366, the retrieved important access roads data 361 and the retrieved navigation data 371.

The processor 320, further executing the module 326, may facilitate communications between the computing device 310 and the client device 305 via a network interface 330, a client device network connection 316 and the network 315. The client device 305 may include a display device 340 which may be any type of electronic display device such as a liquid crystal display (LCD), a light emitting diode (LED) display, a plasma display, a cathode ray tube (CRT) display, or any other type of known or suitable electronic display. The display device 340 may exhibit a display 100 which depicts a geographic map 105 with a location 115 and associated important access roads 120, 125, 127 within a map viewport 110. The client device 305 may include a user input device 335, such as a touch input/keyboard/pointing device (e.g., a mouse) that provides a mechanism for a user of the client device 305 to launch a geographic mapping application, to enter related information and to select a location 115. The user input device 335 may be configured as an integral part of a display device 340, such as a touch screen display device. The network interface 330 may be configured to facilitate communications between the client device 305 and the remote computing device 310 via any hardwired or wireless communication network 315, including for example a hardwired Ethernet connection or a wireless LAN, MAN or WAN, WiFi, the Internet, or any combination thereof. Moreover, the client device 305 may be communicatively connected to the remote computing device 310 via any suitable communication system, such as via any publicly available or privately owned communication network, including those that use wireless communication structures, such as wireless communication networks, including for example, wireless LANs and WANs, satellite and cellular phone communication systems, etc.

The computing device 310 may include a memory 350 and a processor 345 for storing and executing, respectively, modules 351, 352, 353, 354. The modules 351, 352, 353, 354, stored in the memory 350 as a set of computer-readable instructions, facilitates applications related to identifying important access roads (e.g., important access roads 120, 125, 127 of FIG. 1) and providing important access road data 361 to a client device 305. The module 351 may also facilitate communications between the computing device 310 and the client device 305 via a network interface 355, a remote computing device network connection 317 and the network 315 and other functions and instructions.

The computing device 310 may be communicatively coupled to an important access roads database 360 that stores important access road data 361 representative of various important access roads 120, 125, 127 and associations between the important access roads 120, 125, 127 and various locations 115 and/or geographic areas 220a, 220b. The computing device 310 may also be communicatively coupled to a geographic map database 365 that stores geographic map data 366 representative of a geographic map (e.g., geographic map 105 of FIG. 1). While the important access road database 360 and the geographic map database 365 are shown in FIG. 3 as being communicatively couple to the remote computing device 310, it should be understood that the important access road database 360 and/or the geographic map database 365 may be located within separate remote servers (or any other suitable computing devices) communicatively coupled to the remote computing device 310. Optionally, portions of the important access road database 360 and/or portions of the geographic map database 365 may be associated with memory modules that are separate from one another, such as a memory 325 of the client device 305.

Figure 4:
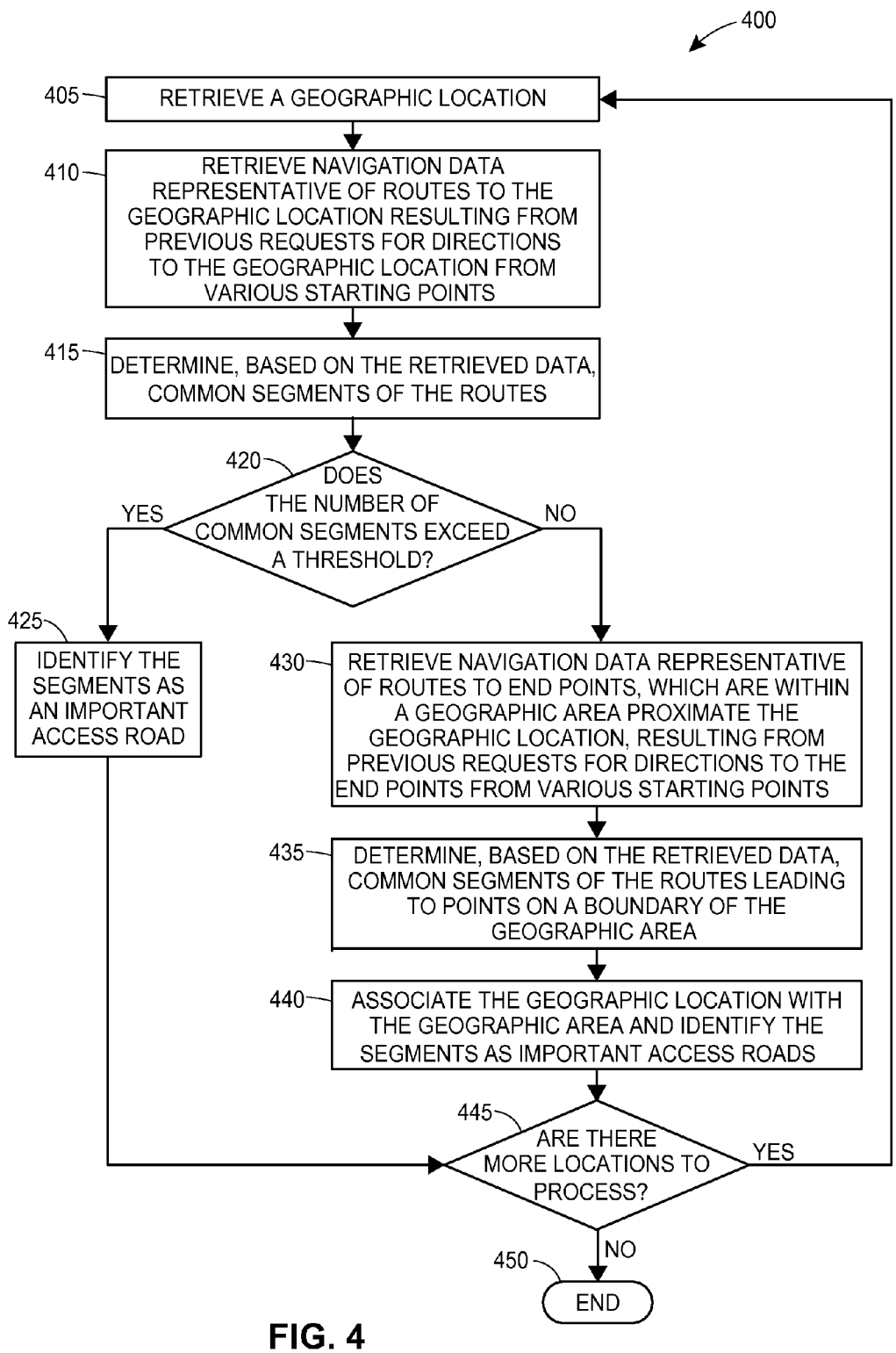
FIG. 4 is a flow diagram of an example method of identifying important access roads to a location or to points on a boundary of a geographic area enclosing the location, which can be implemented in the system of FIG. 3.

With further reference to FIG. 3, and additional reference to FIGS. 4-6, details related to identifying important access roads 120, 125, 127 and presenting the associated important access roads 120, 125, 127 within a geographic map display 100 will be described. The method 400 of FIG. 4 may be implemented by executing batch job module 353 using processor 345. Alternatively, any suitable processor may be utilized to execute equivalent computer-implementable instructions as those described with regard to module 353 to implement method 400. Generally, the method 400 is implemented to identify important access roads 120, 125, 127 and associate the important access roads 120, 125, 127 with a location 115 or identify important access roads 225a, 230a, 235a, 240a and associate the important access roads 225a, 230a, 235a, 240a with a geographic area 220a. Implementation of the method 400 may result in important access road data 361 being stored in an important access road database 360. Preferably, the method 400 is implemented as a batch process on a periodic basis. For example, the method 400 may be implemented according to a periodic schedule such that certain geographic areas are updated daily, weekly, monthly, etc. Alternatively, the method 400 may be implemented for a certain geographic area when known roadway modifications have occurred within the geographic area. In any event, the method 400 may be implemented prior to any given client device 305 requesting important access road data 361.

The method of identifying important access roads 400 may be initiated with processor 345 retrieving a geographic location 115 from a geographic map database 365 (block 405). The location 115 may be representative of a specific point within a geographic map 105, such as a landmark, a building, a business, a restaurant, a park, etc. Alternatively, the location 115 may be representative of an intersection, for example, the intersection of Wacker Drive and Adams Street in Chicago, Ill. The processor 345 may then retrieve navigation data 371 from a navigation service 370 (block 410). The navigation data 371 may be representative of various routes resulting from previous requests for directions to the location 115 from various starting points. The processor 345 may then determine, based on the navigation data 371, common segments of the routes (block 415).

The processor 345 may then determine whether the number of common segments exceeds a threshold number of segments (block 420). The threshold number of segments may be established based on the geographic area in which the location 115 is located. For example, if the location 115 is within a metropolitan area, such as Chicago, Ill., the threshold number of segments may be higher than when the location 115 is in a rural area. Alternatively, the threshold number of segments may be set to some fixed number representative of the number of previous requests for directions to the location 115. In response to determining that the number of common segments exceeds the threshold (block 420), the processor 345 may identify the corresponding segments of the route(s) to the location 115 as important access roads 120, 125, 127, associate the important access roads 120, 125, 127 with the location 115 and store the corresponding important access road data 361 within an important access road database 360 (block 425). The processor 345 may then determine whether there are additional locations 115 to be processed (block 445). In response to determining that there are additional locations 115 to be processed (block 445), the processor 345 may retrieve another location 115 (block 405) and repeat the method 400. In response to determining that there are no additional locations 115 to be processed (block 445), the processor 345 ends the method 400 (block 450).

In response to determining that a number of common segments did not exceed the threshold (block 420), the processor 345 may retrieve navigation data 371 representative of routes to destinations 216a, 217a, 218a, which are within a geographic area 220a proximate the geographic location 215a (block 430). In this case, the navigation data 371 may be representative of routes resulting from previous requests for directions to the location 215a and/or any, or all, of the destinations 216a, 217a, 218a from various starting points. A size of the geographic area 220a may be established such that a certain number of requests for directions is associated with destinations 216a, 217a, 218a within the given geographic area (block 430). Alternatively, the geographic area 220a may be established such that a certain number of common segments are contained within the corresponding routes. In any event, the processor 345 may determine, based on the retrieved navigation data 371, common segments of the routes leading to points 221a, 222a, 223a, 224a on a boundary of the geographic area 220a (block 435). The processor 345 may then identify the common segments as important access roads 225a, 230a, 235a, 240a, associate the location 215a with the geographic area 220a and the important access roads 225a, 230a, 235a, 240a and store the resulting important access road data 361 within the important access road database 360. In response to determining that there are additional locations 115 to be processed (block 445), the processor 345 may retrieve another location 115 (block 405) and repeat the method 400. In response to determining that there are no additional locations 115 to be processed (block 445), the processor 345 ends the method 400 (block 450).

It should be understood that the navigation data 371 retrieved in blocks 415 and 430 may be representative of previously requested directions from the location 115, 215a to various destinations in addition to data representative of previously requested directions to the location 115, 215a from various starting points. By retrieving navigation data 371 that is representative of directions both to and from a location 115, 215a, the method may identify important access roads 120, 125, 127 to a location and, potentially different, important access roads from the location. By identifying important access roads to and from a location, the associated effects of one-way streets may be reflected in the associated geographic map displays.

Figure 5:
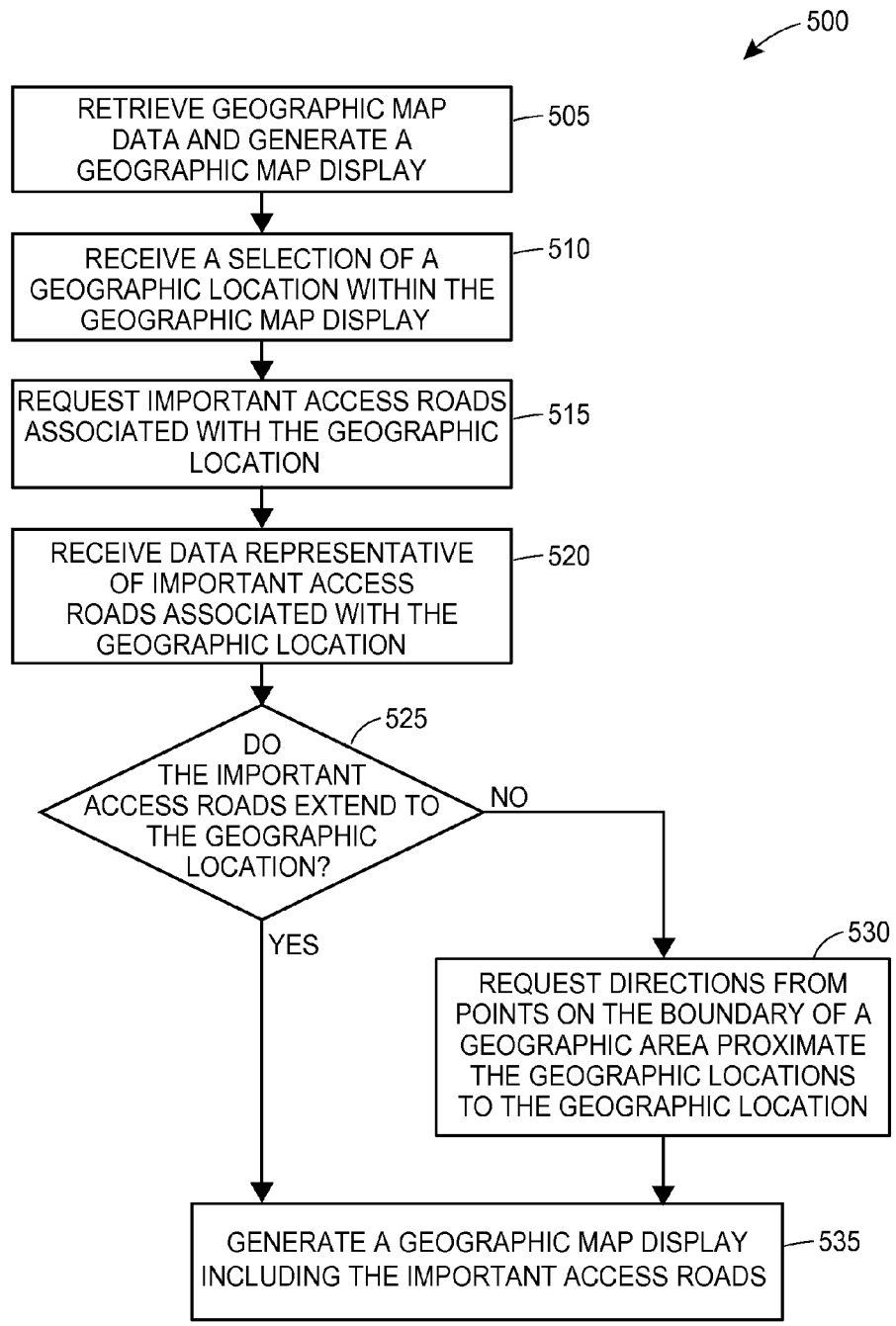
FIG. 5 is a flow diagram of an example method of generating a geographic map having important access roads identified to a location or to points on a boundary of a geographic area enclosing the location, which can be implemented in the system of FIG. 3.

Turning to FIG. 5, a flow diagram for a method 500 of generating a geographic map 100, 200a is depicted. Implementation of the method 500 results in a display 100 having important access roads 120, 125, 127 identified to a location 115 or important access roads 225a, 230a, 235a, 240a identified to points 221a, 222a, 223a, 224a on a boundary of a geographic area 220a proximate the location 215a. In circumstances where the important access roads 225a, 230a, 235a, 240a are identified to points 221a, 222a, 223a, 224a on a boundary of a geographic area 220a, implementation of the method 400 further provides routes from the points 221a, 222a, 223a, 224a to the location 215a. The method 500 of FIG. 5 may be implemented by executing digital mapping module 326 and important access road identification module 327 using processor 320. Alternatively, any suitable processor may be utilized to execute equivalent computer-implementable instructions as those described with regard to modules 326, 327 to implement the method 500. The processor 320 may initiate the method 500 by retrieving geographic map data 366 and generating a geographic map display 100, 200a, 200b with a location 115, 215a (block 505).

The processor 320 may then receive a selection of a location 115, 215a within the geographic map display 100, 200a, 200b (block 510). In response to receiving the selection of the location 115, 215a (block 510), the processor 320 may request important access road data 361 representative of important access roads 120, 125, 127 associated with the location 115 or important access road data 361 representative of important access roads 225a, 230a, 235a, 240a associated with a geographic area 220a that is associated with the location 215a (block 515). In response to requesting the important access road data 361 (block 515), the processor 320 receives the important access road data 361 (block 520).

The processor 320 then determines whether the important access roads 120, 125, 127 or 225a, 230a, 235a, 240a extend to the geographic location 115, 215a (block 525). In response to determining that the important access roads 120, 125, 127 extend to the geographic location 115 (block 525), the processor 320 generates a geographic map display 100 and applies a visual styles to the important access roads 120, 125, 127 so as to highlight these roads or otherwise make these roads visually eminent.

Otherwise, in response to determining that the important access roads 225a, 230a, 235a, 240a do not extend to the location 215a (block 525), the processor 320 requests directions from each of the points 221a, 222a, 223a, 224a on the boundary of the geographic area 220a to the location 215a from a navigation service 370 (block 530). The processor 320 generates a geographic map display 200a including the important access roads 225a, 230a, 235a, 240a and the routes from the points 221a, 222a, 223a, 224a on the boundary of the geographic area 220a to the location 215a highlighted or otherwise visually eminent.

Figure 6:
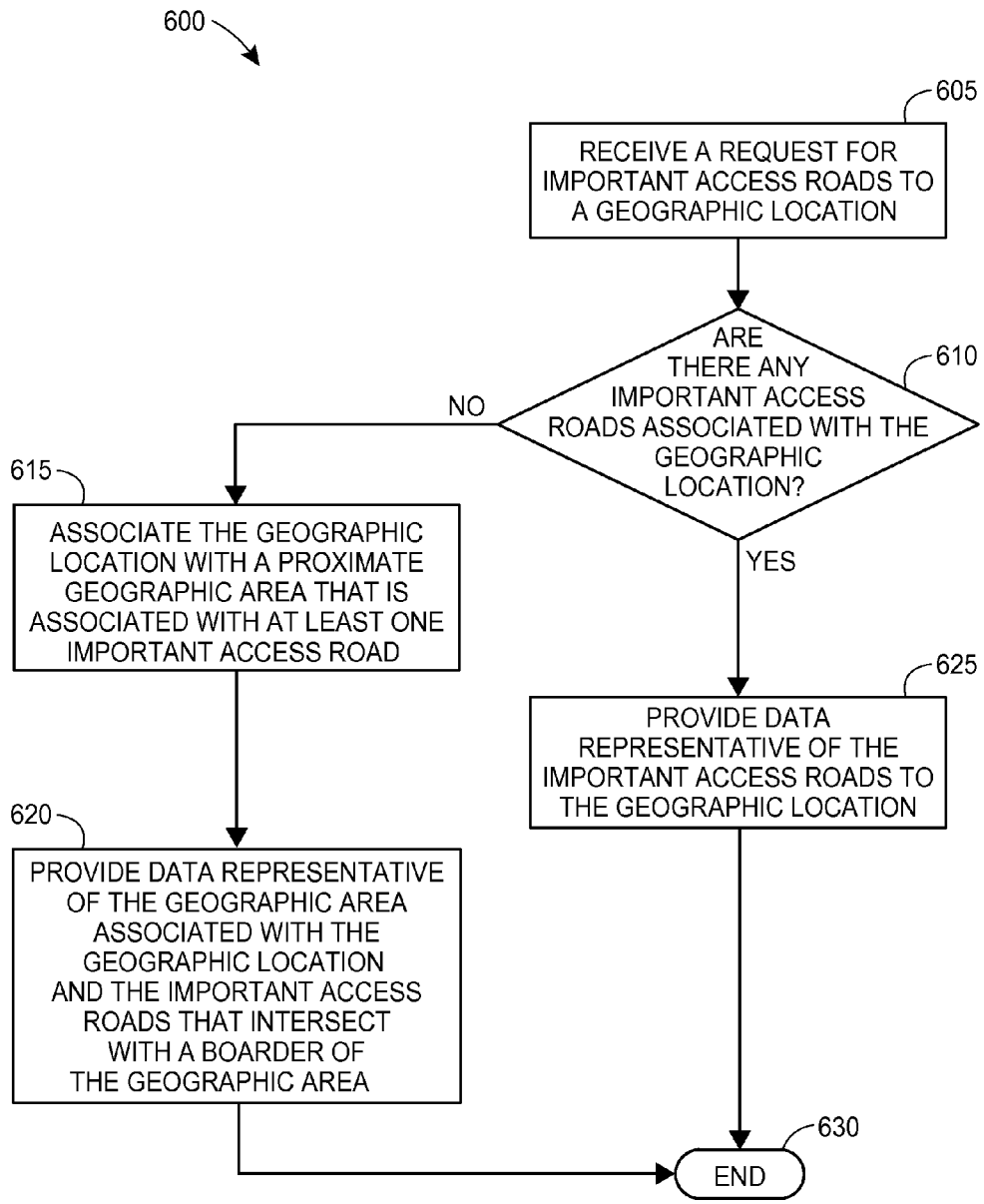
FIG. 6 is a flow diagram of an example method of providing data representative of important access roads to a location or to points on a boundary of a geographic area proximate the location, which can be implemented in the system of FIG. 3

Turning to FIG. 6, a flow diagram for a method 600 of providing important access road data 361 is depicted. The important access road data 361 may be representative of important access roads 120, 125, 127 to a location 115 or important access roads 225a, 230a, 235a, 240a to points 221a, 222a, 223a, 224a on a boundary of a geographic area 220a proximate the location 215a. The method 600 may be implemented by execution of the client request module 354 by processor 345. Alternatively, the method 600 may be implemented by any suitable processor executing computer-readable instructions equivalent to those described with regard to module 354. In response to receiving a request for important access road data 361 (block 605), the processor 345 may determine whether there are any important access roads associated with the location 115, 215a (block 610).

In response to determining that there are important access roads 120, 125, 127 associated with the location 115 (block 610), the processor 345 provides important access road data 361 representative of the important access roads 120, 125, 127 (block 625). The processor 345 then terminates the method 600 (block 630).

In response to determining that there are no important access roads associated with the location 215a (block 610), the processor 345 associates the location 215a with a geographic area 220a that is proximate the location 215a (block 615). The processor 345 then provides important access road data 361 representative of the important access roads 225a, 230a, 235a, 240a extending to points 221a, 222a, 223a, 224a on a boundary of the geographic area 220a associated with the location 215a.

As an alternative to the above discussion with respect to various portions of FIGS. 5 and 6, the processor 320 may associate the location 215a with a geographic area 220a and then request important access road data 361 associated with the geographic area 220a. In this case, the processor 345 would simply provide the important access road data 361 as in block 620. The processor 345 would not need to associate the location 215a with the geographic area 220a (block 615).

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules or hardware modules. A hardware module is tangible unit capable of performing certain operations and may be configured or arranged in a certain manner. In example embodiments, one or more computer systems (e.g., a standalone, display or server computer system) or one or more hardware modules of a computer system (e.g., a processor or a group of processors) may be configured by software (e.g., an application or application portion) as a hardware module that operates to perform certain operations as described herein.

In some embodiments, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, modules and routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of identifying important access roads to a location or a to geographic area proximate the location for purposes of illustration only. One skilled in the art will readily recognize from the accompanying discussion that alternative embodiments of the structures and methods illustrated herein may be employed without departing from the principles described herein.

Upon reading this disclosure, those of skill in the art will appreciate still additional alternative structural and functional designs for identifying important access roads to a location or to a geographic area proximate the location. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing system for identifying important access roads for a geographic location, the method comprising:
   identifying, by one or more processors, a plurality of previous requests for directions between a multiplicity of sources and one or more destinations identical, or proximate, to the geographic location;
   determining, by the one or more processors, routes between the multiplicity of sources and the one or more destinations;
   identifying, by the one or more processors, (i) a first road segment that is commonly shared by at least two of the determined routes, and (ii) a second road segment that is commonly shared by at least two additional of the determined routes;
   determining, by the one or more processors, that the first road segment is used more frequently than the second road segment; and
   designating, by the one or more processors, the first road segment as an important access road for the geographic location.

2. The method of claim 1 implemented in a server operating in a communication network, the method further comprising:
   repeating the acts of (i) determining routes, (ii) identifying a first and second road segments, (iii) determining frequency of use, and (iv) designating the first road segment as an important access road for a plurality of geographic locations including the geographic location; and storing the designated important access road for the plurality of geographic locations in a database.

3. The method of claim 2, further comprising:
   subsequently to storing the designated important access roads for the plurality of geographic locations in the database, receiving a request for important access roads from a client device, wherein the request specifies the geographic location;
   in response to receiving the request, retrieving the designated important access roads for the geographic location from a database; and
   providing the retrieved designated important access roads to the client device.

4. The method of claim 1, wherein identifying the plurality of previous requests for directions between the multiplicity of sources and the one or more destinations includes:
   identifying a number of requests in which the one or more destinations are identical to the geographic location,
   in response to determining that the number of requests exceeds a threshold value, determining at least a portion of the routes that are between the multiplicity of sources and the geographic location,
   otherwise, in response to determining that the number of requests is below the threshold value, (i) selecting a geographic area that encloses the geographic location, (ii) determining at least a portion of the routes that are between the multiplicity of sources and multiple destinations within the geographic area, and (iii) identifying the first and second road segments that are commonly shared and that terminate at a boundary of the geographic area.

5. The method of claim 4, further comprising determining a size of the geographic area based on population density near the geographic location.

6. The method of claim 1, wherein determining the routes includes requesting driving directions according to a fastest route option.

7. The method of claim 1, wherein the important access road is within a predetermined radius of the geographic location.

8. The method of claim 1, wherein the important access road connects the geographic location to one or more high-speed roads.

9. A method in a computing system for identifying important access roads for a geographic location, the method comprising:
   selecting, by one or more processors, a geographic area that encloses the geographic location;
   identifying, by the one or more processors, previous requests for directions between a multiplicity of sources and a plurality of destinations within the geographic area;
   determining, by the one or more processors, routes between the multiplicity of sources and a boundary of the geographic area;
   identifying, by the one or more processors, a first road segment that is commonly shared by at least two of the determined routes, and (ii) a second road segment that is commonly shared by at least two additional of the determined routes;
   determining, by the one or more processors, that the first road segment is used more frequently than the second road segment; and
   designating, by the one or more processors, the first road segment as an important access road for the geographic area.

10. The method of claim 9, wherein selecting the geographic area is in response to determining that a number of previous requests for directions to the geographic location is below a threshold value.

11. The method of claim 9, wherein the important access road terminates at a point on the boundary of the geographic area; and wherein the method further comprises:
- determining at least one additional route between the point and the geographic location.

12. The method of claim 11, wherein:
- the designating of the first road segment as the important access road is implemented in a batch process scheduled independently of the selection of the geographic area, and
- the determining of the at least one additional route between the point and the geographic location is implemented in real time in response to a user selecting the geographic location via a user interface.

\* \* \* \* \*